US012377662B2

(12) United States Patent
Feldman et al.

(10) Patent No.: US 12,377,662 B2
(45) Date of Patent: Aug. 5, 2025

(54) DIGITAL GARMENT PRINTING MACHINE AUGMENTED TO APPLY ADDITIONAL MATERIALS

(71) Applicant: Kornit Digital Ltd., Rosh HaAyin (IL)

(72) Inventors: Lavit Feldman, ShaAr Effraim (IL); Lior Iagher, Ramat Gan (IL); Ilan Shmuel Mano, Ramat-Gan (IL); Jacob Mann, Zoran (IL)

(73) Assignee: Kornit Digital Ltd., Rosh HaAyin (IL)

( * ) Notice: Subject to any disclaimer, the term of this patent is extended or adjusted under 35 U.S.C. 154(b) by 0 days.

(21) Appl. No.: 18/684,704

(22) PCT Filed: Aug. 18, 2022

(86) PCT No.: PCT/IL2022/050906
§ 371 (c)(1),
(2) Date: Feb. 19, 2024

(87) PCT Pub. No.: WO2023/021517
PCT Pub. Date: Feb. 23, 2023

(65) Prior Publication Data

US 2024/0326471 A1 Oct. 3, 2024

Related U.S. Application Data

(60) Provisional application No. 63/234,752, filed on Aug. 19, 2021.

(51) Int. Cl.
*B41J 3/44* (2006.01)
*B41J 3/407* (2006.01)
(Continued)

(52) U.S. Cl.
CPC ............... *B41J 3/44* (2013.01); *B41J 3/4078* (2013.01); *B41J 15/046* (2013.01); *D06P 5/30* (2013.01)

(58) Field of Classification Search
CPC ...... B41J 11/0015; B41J 11/06; B41J 3/4073; B41J 3/546; B41J 3/44; B41J 3/4078;
(Continued)

(56) References Cited

U.S. PATENT DOCUMENTS

| | | | | |
|---|---|---|---|---|
| 6,059,391 A * | 5/2000 | Fulkerson | B41J 3/28 347/2 |
| 2004/0036726 A1 | 2/2004 | Zach | |

(Continued)

FOREIGN PATENT DOCUMENTS

| | | |
|---|---|---|
| EP | 2318211 | 11/2016 |
| JP | 2020-26044 | 2/2020 |
| WO | WO 2023/021517 | 2/2023 |

OTHER PUBLICATIONS

International Preliminary Report on Patentability Dated Feb. 29, 2024 From the International Bureau of WIPO Re. Application No. PCT/IL2022/050906. (6 Pages).

(Continued)

*Primary Examiner* — Jannelle M Lebron

(57) ABSTRACT

A textile printer with decoration support comprises a track for a printing pallet extending along a first axis, the printing pallet being controllably mobile along the track, a rail for a print head, the rail along a second axis at right angles to the first axis, a digital print head mounted on the rail and controllably mobile along the second axis to scan across the printing pallet and print an image onto a garment on the printing pallet using textile printing inks, and a material deposition head also mounted to scan across the printing pallet to deposit material onto the garment in alignment with the image.

12 Claims, 9 Drawing Sheets

(51) Int. Cl.
*B41J 15/04* (2006.01)
*D06P 5/30* (2006.01)

(58) Field of Classification Search
CPC . B41J 15/046; B41J 11/20; B41J 3/407; B41J 25/308; B41F 15/18; B41F 17/003; B41F 15/10; B41F 15/26; B41F 17/005; B41F 15/04; B41M 1/12; B41M 1/26; B41M 5/0047; B41M 5/0088; B41M 5/0011; B41M 5/0082; B41M 5/0041; D06P 5/30
See application file for complete search history.

(56) References Cited

U.S. PATENT DOCUMENTS

2005/0155500 A1* 7/2005 Latos .................. B41F 15/0863 101/129
2009/0097044 A1* 4/2009 Zach ........................ B41J 3/543 358/1.8
2009/0142552 A1 6/2009 Craamer
2018/0215171 A1* 8/2018 Schiestl ................. B41J 3/4078
2021/0245524 A1 8/2021 Hoffman, Jr. et al.

OTHER PUBLICATIONS

International Search Report and the Written Opinion Dated Jan. 26, 2023 From the International Searching Authority Re. Application No. PCT/IL2022/050906 (10 Pages).

* cited by examiner

*With scan /raster only*

*With vector addition*

Fig. 7 - Prior Art

Option 1 - DTG Printer with integrates MD system on the PH Assy

- High impact on throughput
- Limited options for MD applicators and fluids
- Low BOM cost
- Simple integration Option 2 - DTG Printer with MD with separate X axis and common Y/Z axes

- Minimum impact on throughput
- Support for multiple MD applicators and fluids
- Medium BOM cost
- Complex integration

DIGITAL GARMENT PRINTING MACHINE AUGMENTED TO APPLY ADDITIONAL MATERIALS

RELATED APPLICATIONS

This application is a National Phase of PCT Patent Application No. PCT/IL2022/050906 having International filing date of Aug. 18, 2022, which claims the benefit of priority under 35 USC § 119 (e) of U.S. Provisional Patent Application No. 63/234,752 filed on Aug. 19, 2021. The contents of the above applications are all incorporated by reference as if fully set forth herein in their entirety.

FIELD AND BACKGROUND OF THE INVENTION

The present invention, in some embodiments thereof, relates to a digital garment printing machine and, more particularly, but not exclusively, to a digital printing machine modified to apply additional materials to a garment which are not suitable for a digital printer.

As part of the digital printing process on garments there is often a requirement to deposit material on the garments that does not work with inkjet printing. Instead a Material Deposition applicator (MD) may be used to provide such materials and such material deposition may be required before or after printing, for example either under the printed image and/or above or beside the printed image.

Such materials may include:

Base-layer under the image-such as fixation fluids

Decoration above or beside the image in specific locations or areas-say to highlight specific areas, add glitters, etc. (refer to the examples and pictures below)

Create 3D patterns or effects under or above the printed image, by use of a single or multiple layers.

Such materials cannot be provided using standard inkjet technology, since inkjet technology has very specific requirements for suitable inks. Instead the materials may be applied through a Material Deposition applicator (MD). MD applicators have characteristics that enable application of these materials, that are different in many ways from the strict requirements of the inkjet printheads.

An MD system may be based on numerous deposition technologies such as spray valves and nozzles, valve jets, Fused Deposition Modeling (FDM), etc. and may be mounted on a 3-degrees of freedom (3DoF, XYZ) controllable and accurate motion system.

In all these cases, the deposition of the materials on the substrate (garment) in the MD system is characterized by relatively wide points (in case of drop-on-demand system), or wide lines (in cases of continuous deposition). That is to say with inkjet printing a printed pixel is between 50-100 μm and using MD the pixel size may be approximately 0.25-5 mm giving a difference of two orders of magnitude.

In order to obtain the desired effects, the position accuracy of the additional layers needs to comply with the pattern requirements and the overall design of the end-result, and thus measures need to be taken to avoid misalignment between the layers. In most cases the required accuracy is in the sub-millimeter range, so a good alignment (registration) between the printed image and the material deposition is mandatory. This in turn requires that the two subsystems (inkjet printer and MD) are fully synchronized mechanically.

The current solutions for adding details or layers to printed garments are mainly based on external, standalone systems on which the garments to be printed are mounted on separately, after printing the image, to apply the additional applications. Such a two-stage method has an inherently low accuracy as the two systems use separate platforms, are relatively expensive, since it is based on two standalone systems, and the combined printing is time-consuming with low throughput since it requires a manual mount and remount of the garment between separate systems. Also such a two-stage method cannot provide a feasible solution when it is required to carry out sequences of operations that alternate between the types of operation. For example there may be a requirement to print an image using inkjet printing, then use MD to deposit a decoration on the image, and then to print on the MD decoration using the inkjet and appropriate registration.

Furthermore, digital printers print very rapidly, and MD systems are much slower. Thus moving the garments to an external device leads to an extreme reduction in the overall throughput, that is of total numbers of printed garments per hour and hence considerably reduces the printer's ability to produce output.

As well as MD systems, other types of decorative or utilitarian additions may be required for the garment, such as embroidery or addition of buttons. The same issues of alignment apply and machines for carrying out embroidery are much slower than digital printing machines.

SUMMARY OF THE INVENTION

Superficially it looks attractive to mount the MD systems on the same device as the digital print head, however the difference in printing speed means that all that is achieved is to turn a rapid printing machine into a very slow printing machine. In addition, the digital print head is very sensitive to contamination, since the nozzles are extremely small, and thus material deposition is something that one would not wish to carry out very near to a digital print head.

Nevertheless, the present embodiments find ways to place the MD system so as to operate on the same system as the digital printer so that only one alignment is required for both operations. When the MD system is applied to a dual pallet printer then the MD system may be operated while the second pallet is being loaded, so that the amount of time lost is minimized. The MD system may be kept at a preset minimal distance from the digital print head so that the print head and the MD system are not operating at the same time or not operating on the same pallet at the same time.

According to an aspect of some embodiments of the present invention there is provided a textile printer with decoration support comprising:

a track for a printing pallet extending along a first axis, the printing pallet being controllably mobile along said track;

a rail for a print head, the rail along a second axis at right angles to said first axis;

a digital print head mounted on said rail and controllably mobile along said second axis to scan across said printing pallet and print an image onto a garment on said printing pallet using textile printing inks; and a material deposition head also mounted to scan across said printing pallet to deposit material onto said garment in alignment with said image.

In an embodiment, said material deposition head is mounted on said second axis with said print head.

In an embodiment, said material deposition head is mounted on a third axis parallel to said second axis, to be movable along said third axis.

In an embodiment, said material deposition head is mounted to be movable along a fourth axis parallel to said first axis.

Embodiments may encompass a dual pallet printer having two parallel tracks, one along said first axis and one along a fifth axis parallel to said first axis, said digital printing head being configured to scan across both said first axis and said fifth axis.

Embodiments may encompass a dual pallet printer having two parallel tracks, one along said first axis and one along a fifth axis parallel to said first axis, said digital printing head being configured to scan across both said first axis and said fifth axis and said material deposition head being configured to scan along said third axis across both said first axis and said fifth axis.

In an embodiment, the digital print head and the material deposition head are controllable not to operate simultaneously on the same pallet, thereby to prevent contamination of the digital print head by material being deposited by the material deposition head.

In an embodiment, the material deposition head is configured to provide layers of material for three-dimensional effects.

In an embodiment, the material deposition head is configured to provide an undercoat for said image.

In an embodiment, the material deposition head is configured to provide glitter.

In an embodiment, the material deposition head is configured to provide highlight or glitter.

In an embodiment, the material deposition head is an embroidery head for embroidering into said garment.

In an embodiment, the material deposition head is an attachment head for attaching and sewing on buttons.

In an embodiment, the material deposition head is configured to provide vector scanning and raster scanning.

According to a second aspect of the present invention there is provided a roll-to-roll fabric printer with decoration support comprising:

- a path extending along a first axis for controllably feeding fabric between a first roll and a second roll;
- a rail for a print head, the rail along a second axis at right angles to said first axis;
- a digital print head mounted on said rail and controllably mobile along said second axis to scan across said first axis and print an image onto said fabric using fabric printing inks; and
- a material deposition head also mounted to scan across said first axis to deposit material onto said fabric in alignment with said image.

According to a third aspect of the present invention there is provided a method for textile printing with decoration support comprising:

- sending textile to be printed along a first axis;
- controllably moving a print head along a second axis at right angles to said first axis to scan across said textile and print an image onto said textile using textile printing inks; and
- controllably moving a material deposition head along a third axis parallel to said second axis and at right angles to said first axis to scan across said textile to deposit material onto said textile in alignment with said image.

The method may involve providing a fourth axis parallel to said first axis and moving said material deposition head along said fourth axis to provide a second degree of freedom to said material deposition head.

The method may involve controlling said material deposition head to scan in raster fashion and alternatively to scan in vector fashion.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 10:
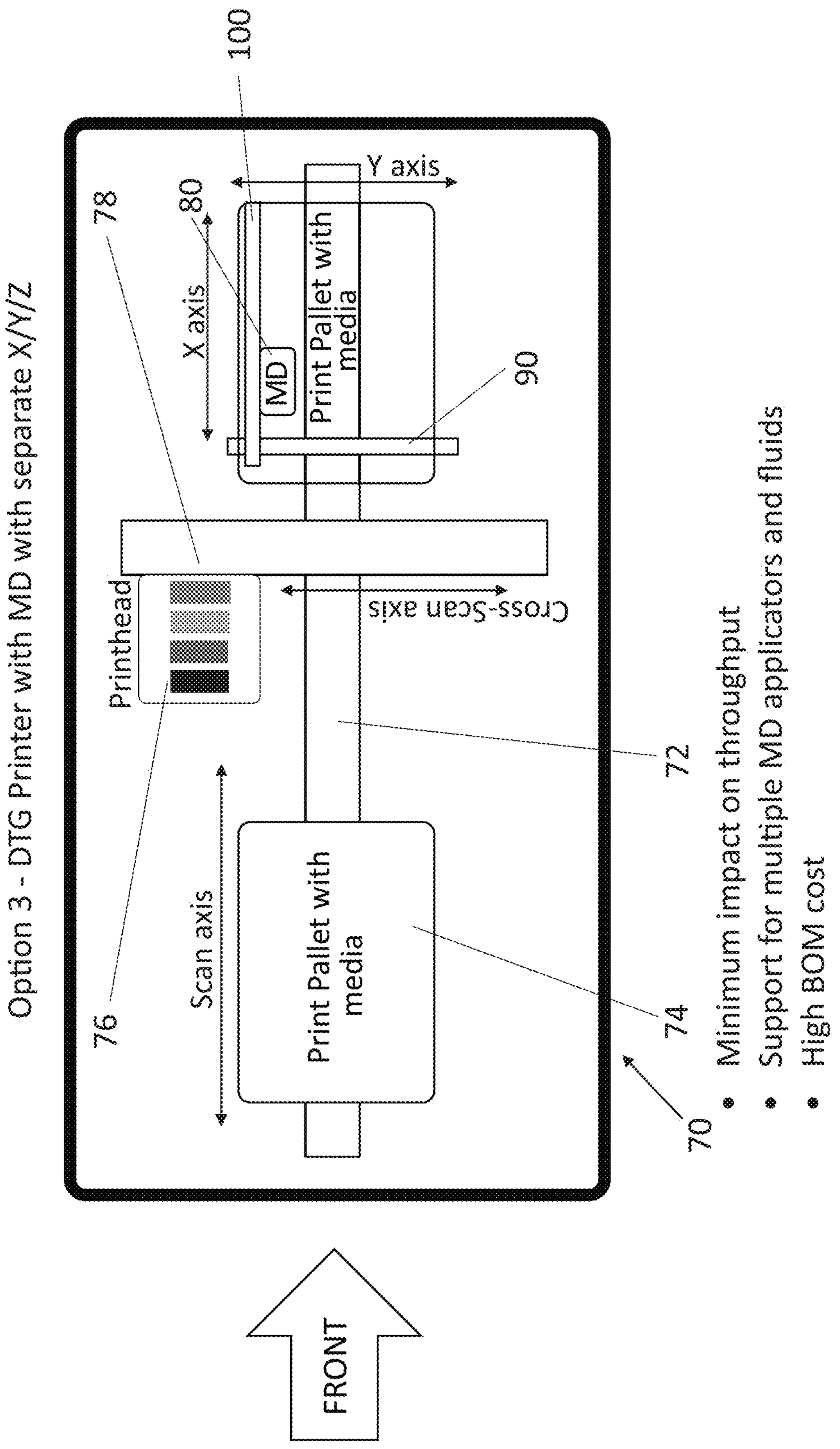
Figure 11:
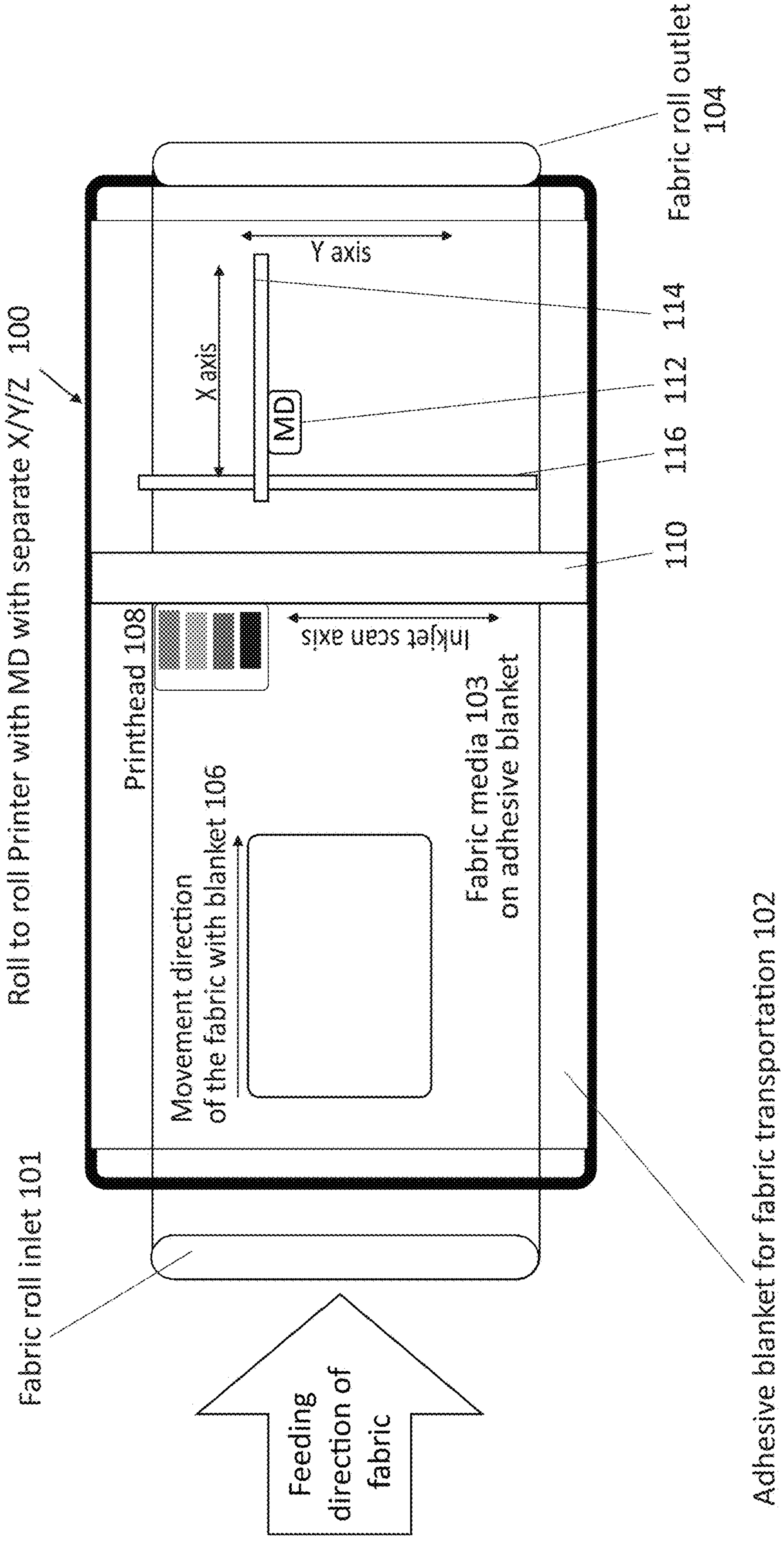

FIG. 10 is a simplified view from above of an embodiment of the present invention in which the material deposition head is mounted on an axis parallel to that of the digital print head and has a second degree of freedom parallel to the passage of the print pallet; and FIG. 11 is a simplified view from above of a roll-to-roll printer modified according to a further embodiment of the present invention.

DESCRIPTION OF SPECIFIC EMBODIMENTS OF THE INVENTION

The present invention, in some embodiments thereof, relates to a digital printing machine for any substrate requiring printing and decoration and including such substances as paper, plastics, metal etc. but more particularly, and not exclusively a textile printing machine and, furthermore, again not exclusively, to a digital textile printing machine. The textile printing machine may be modified to apply additional materials that are not suitable for digital inkjet printing and cannot be applied through the nozzles of a digital inkjet printer, in addition to providing standard inkjet printing.

The present embodiments may combine the raster based digital printer with a raster or vector-based material deposition subsystem in a single platform, so both technologies are fully integrated.

For a device such as an MD applicator there may be a need for at least two degrees of freedom (DoF) (XY) and an optional addition of a third DoF (Z) to provide movements that enable accurate deposition at any required location on the printed textile or garment (in X & Y) at the required height (Z axis).

Possible advantages of the combined system over other options are as follows:

- improved position accuracy since the garment remains on the same system and both systems are mounted on the same mechanical platform;
- Low additional cost since only mandatory components are added, with minimum redundant parts;
- Reduced impact on the system's throughput since both subsystems are inline and operating in accordance with a joint sequence, and are thus able to work in full synchronization;
- Can support any sequence and order of the printing stages since the textile remains mounted on the same printing system and can move back and forth between the stations as required; and
- Can increase the system's throughput by using the movement of the MD to cover specified contours more rapidly.

It is to be noted that certain MD applicators may be provided as an array of applicator nozzles, or may be provided as a single nozzle, for example in a valve jet system. However, in order to use the XY DoF in the same movement the system may use only one applicator for such a printing mode.

A possible embodiment is a roll to roll inkjet textile printer with a single axis for the standard inkjet printheads and another axis downstream of the inkjet axis with an MD applicator. The MD applicator may be provided with the capability of covering at least 10 cm with XY (and optional Z) directions to create a vector deposition ability, as will be discussed in greater detail below.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1A:
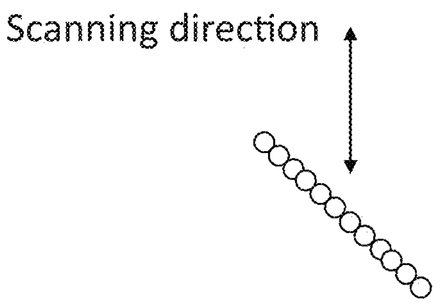
FIGS. 1A and 1B illustrate raster and vector scans respectively as provided by material deposition heads mounted in accordance with embodiments of the present invention.
Figure 1B:
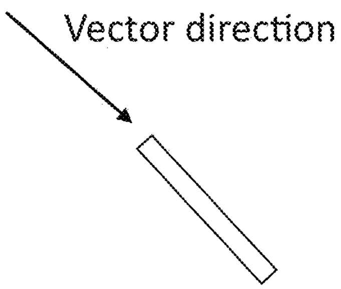
Figure 2:
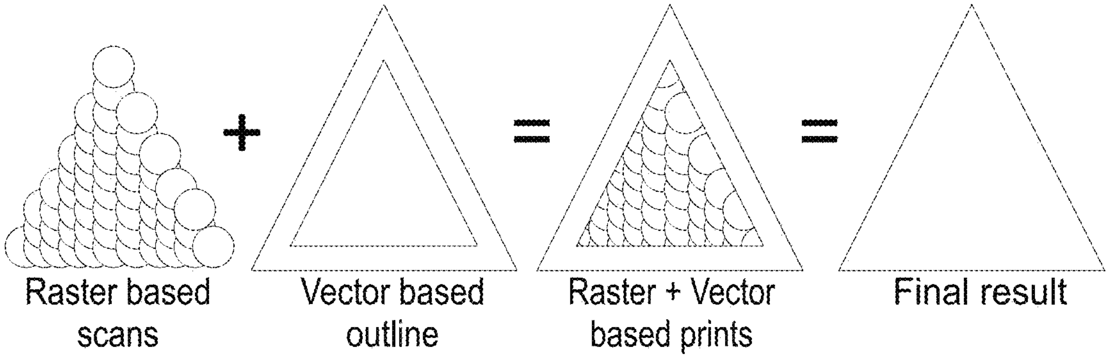
FIG. 2 illustrates an efficient way of making a shape by combining vector and raster scanning according to embodiments of the present invention.
Figure 3A:
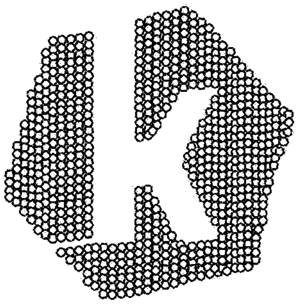
FIGS. 3A and 3B illustrate an embossed image made using raster scanning only and using combined raster and vector scanning according to embodiments of the present invention.
Figure 3B:
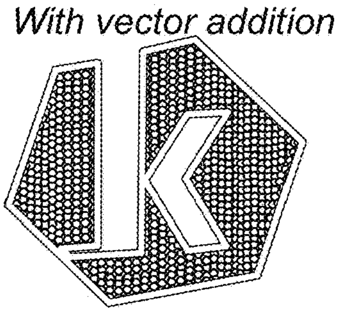

Referring now to the drawings, FIGS. 1A-B and 2 illustrate raster scanning and vector scanning according to the present embodiments. If a diagonal line is drawn using raster scanning—FIG. 1A, then rough edges are produced as the pixels do not fully line up. If vector scanning is used, then a straight line is drawn—FIG. 1B, since the scan direction aligns with the line direction. Generally with inkjet printing the pixels are small so the difference is negligible, but with MD, the differences can be quite noticeable, hence there is an advantage, when combining the systems, to include an ability for vector scanning for the MD system. Even so, raster scanning is faster than vector scanning, and FIG. 2 illustrates how a shape having diagonal edges may be printed more efficiently by combining raster scanning of the object interior with vector scanning to produce the outline. FIGS. 3A and 3B illustrate an embossed shape with diagonal lines being printed. FIG. 3A uses raster scanning only and FIG. 3B adds vector scanning for the outline.

Figure 4A:
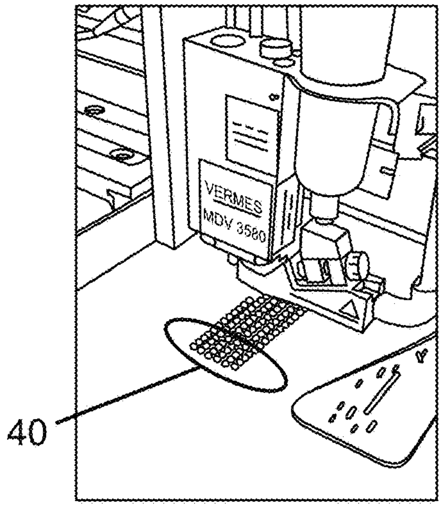
FIGS. 4A and 4B illustrate material deposition using raster scanning only.
Figure 4B:
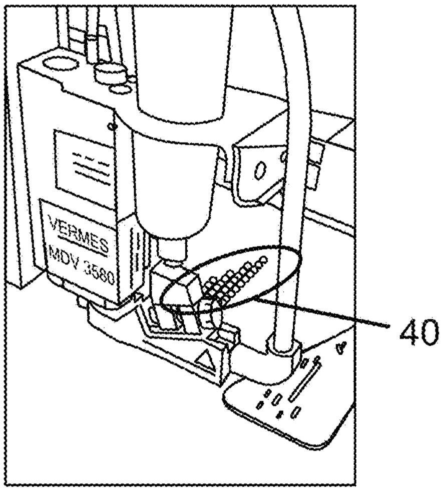
Figure 5:
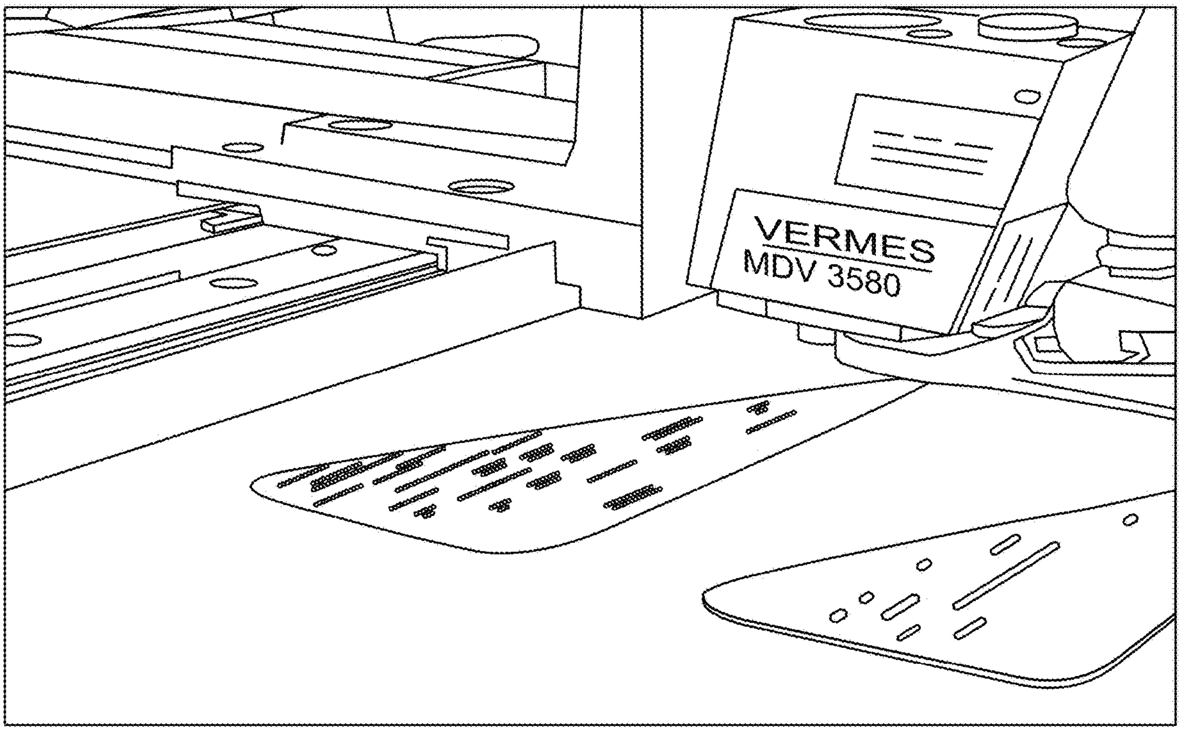
FIG. 5 illustrates completion of the image formed by material deposition in FIGS. 4A and 4B using vector scanning according to embodiments of the present invention.

FIGS. 4A and 4B further illustrate deposition of material using wide scan lines, as shown within circles 40. FIG. 5 shows the same shapes smoothed using vector scanning around the edges.

Figure 6:
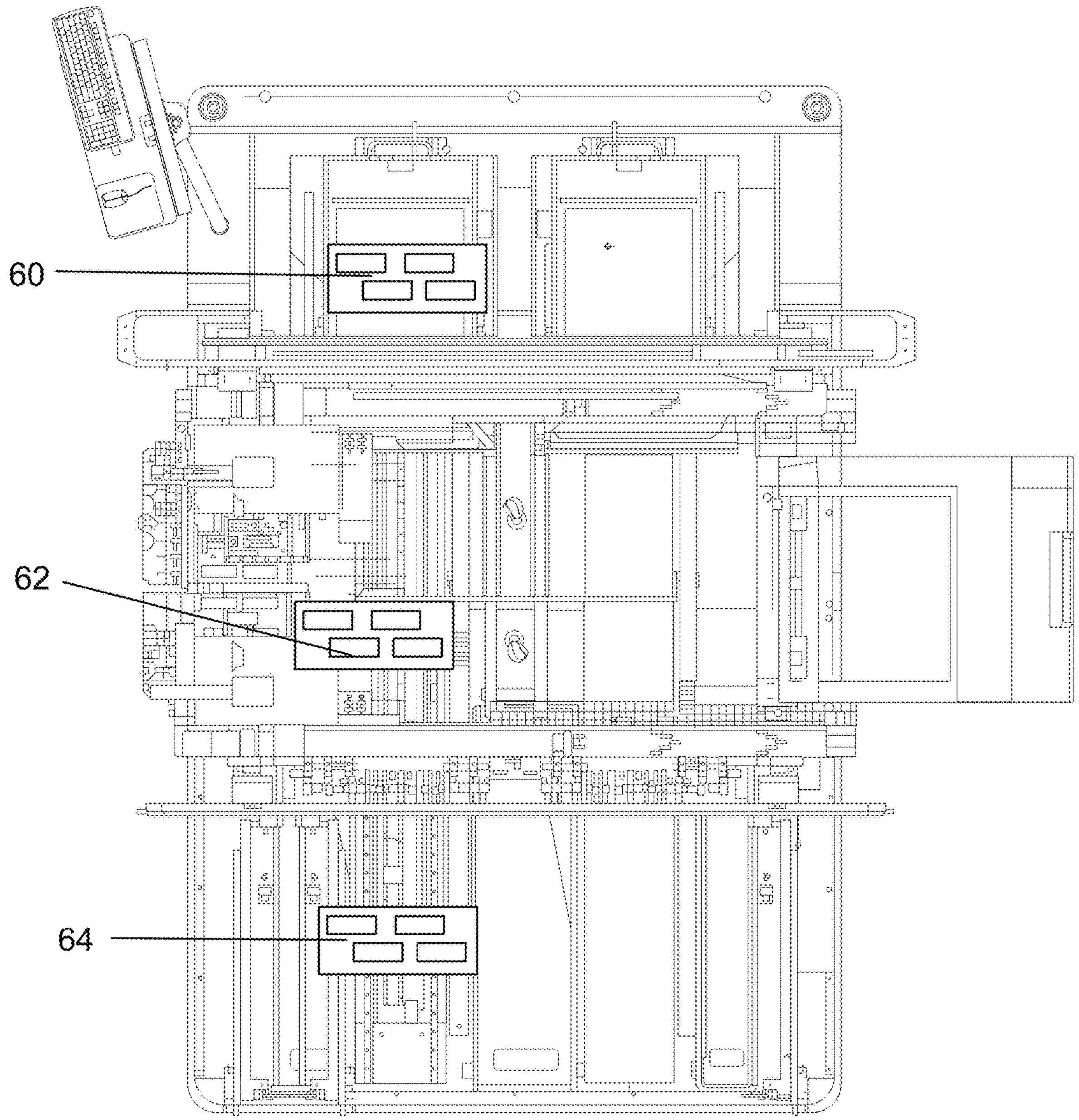
FIG. 6 is a view from above showing three different configurations for a material deposition head according to embodiments of the present invention.

Reference is now made to FIG. 6, which is a view from above of a dual pallet digital printing machine and which illustrates three ways to integrate the MD application subsystem with digital printing according to the present embodiments.

One method is provide the MD system at the front end as a full XY axis system 60.

A second method is to provide the MD system in the middle combined with the main printhead assembly—62.

A third method is to provide the MD system at the rear—where it may be provided with a single or dual axes 64.

The first method, 60, may use the same XYZ axes and bridges as the printhead assembly with the additional MD applicator (e.g., valve-jet or nozzle array(s)); this is the less expensive option, with minimum additional hardware and good accuracy, but it limits the deposition system and does not optimize the use of the printer's resources.

The second method, 62, may involve adding a separate three-axes (XYZ) subsystem to the printer, located either in the front or rear side of the printer, before or after the printhead assembly, respectively. Option 62 is more expensive in BOM (HW) terms but optimizes the use of the printer's resources.

The third method 64 is to add a separate two-axes (YZ) subsystem (bridge) to the printer, located at the front of the rear side, and to use the third axis in common with the printer's scan axis. This is the most cost-effective option with minimum hardware additions (a single bridge) and with good throughput.

Each of these arrangements may support both 'raster' (rectangular motions in scan pattern) based printing and 'vector' (polar motions with combined X and Y movements) based deposition on the same platform and within the same sequence.

Figure 7:
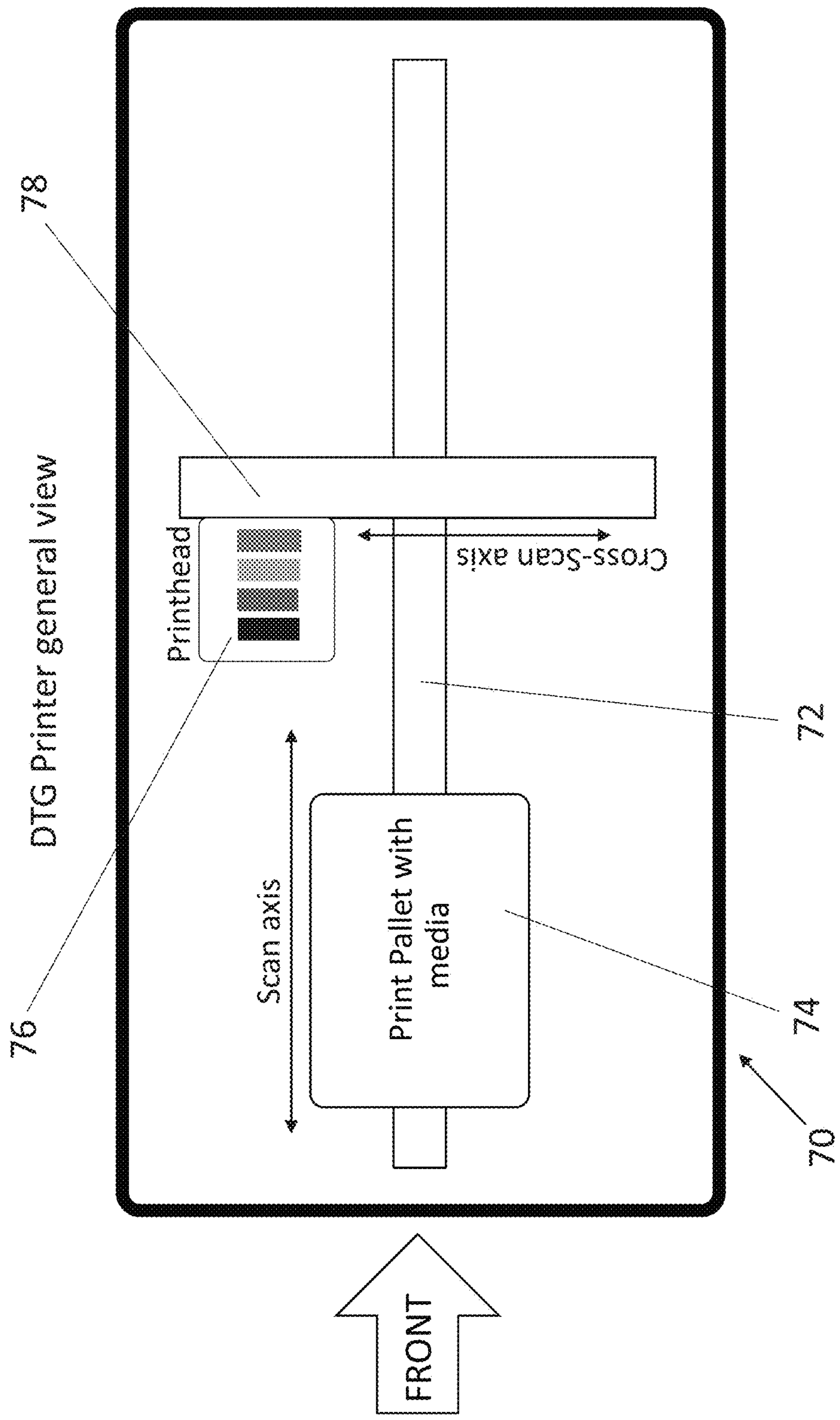
FIG. 7 is a view from above of a known digital printer.

FIG. 7 illustrates a general view of an existing textile printer 70 having a rail 72 along which a print pallet 74 may travel. A print head 76 is mounted on a second rail 78 along a second axis and so is able to scan across the cross-scan axis over the pallet to print an image on a garment on the pallet.

Figure 8:
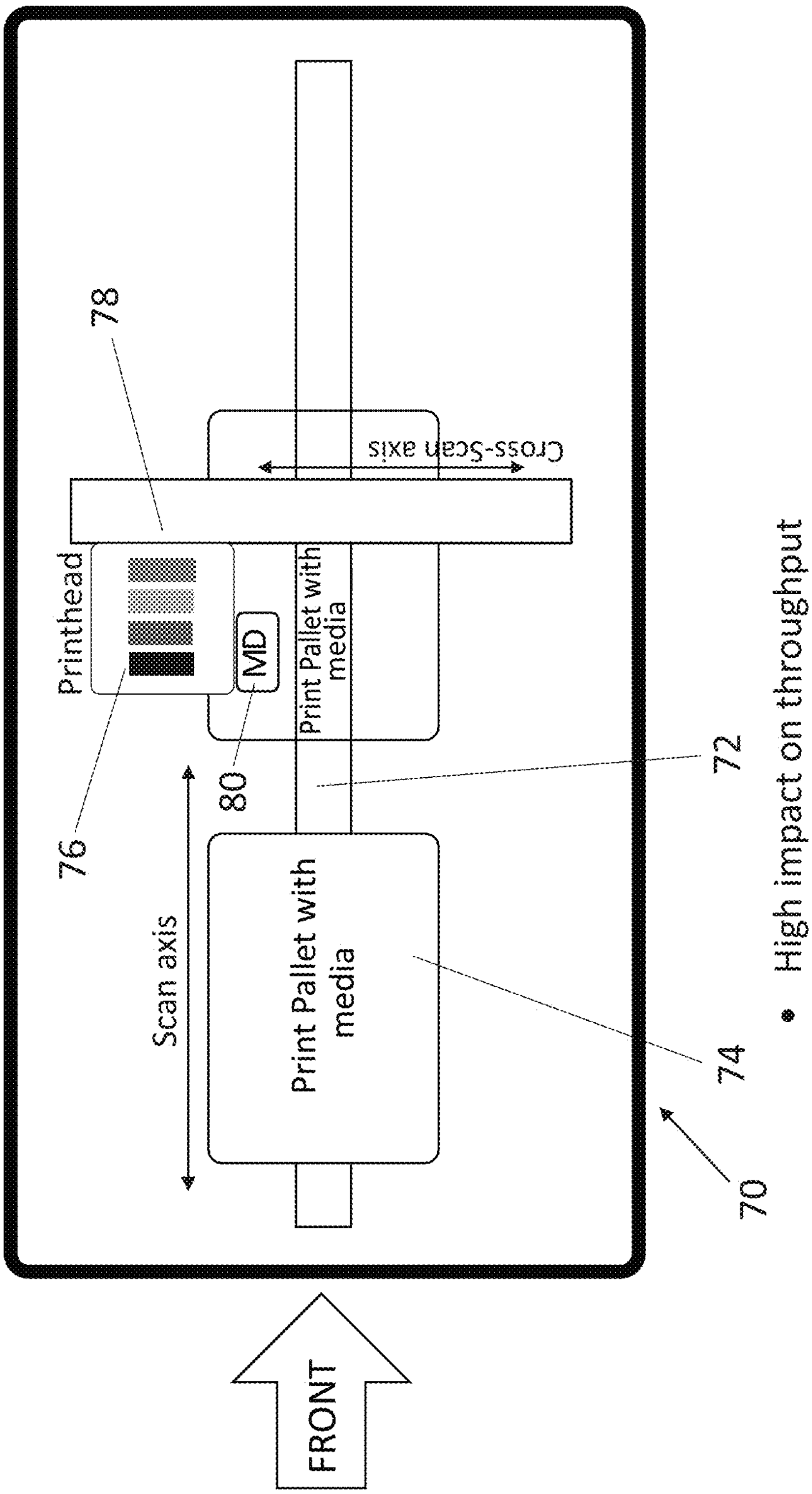
FIG. 8 is a simplified view from above of an embodiment of the present invention in which the material deposition head is mounted on the same axis as the digital print head.

Referring now to FIG. 8, and a material deposition head 80 is mounted on the second rail 78 along the second axis with the print head 76. The integration is simple since very little addition is needed to the machine. However, the impact on throughput is relatively high since the two heads cannot be used at the same time.

Figure 9:
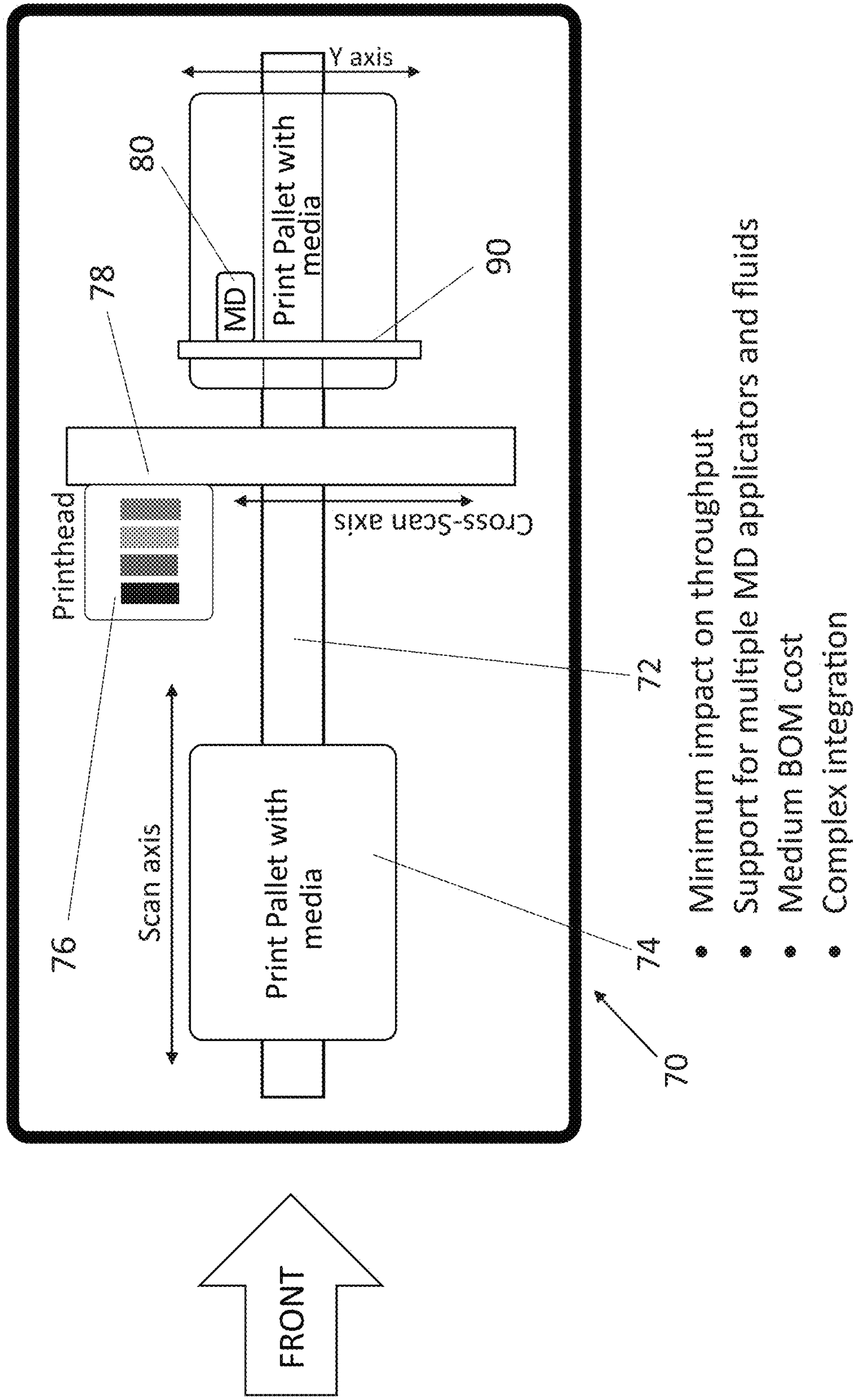
FIG. 9 is a simplified diagram from above of an embodiment of the present invention in which the material deposition head is mounted on an axis parallel to that of the digital print head.

Referring now to FIG. 9, and material deposition head 80 is mounted on a third rail 90 which is along a third axis parallel to the second axis. Thus, the material deposition head is movable along the third axis. Here the impact on throughput is less, there is wider support for different materials for deposition and even for multiple MD applicators, and the integration is more complex than for FIG. 8 since an additional rail 90 is needed.

Reference is now made to FIG. 10 in which a material deposition head 80 is mounted to be movable not only along rail 90 and the third axis, but also along rail 100 and a fourth axis, the fourth axis being parallel to the first axis.

As discussed in respect of FIG. 6, there may be two parallel rails with pallets and then the print head and material deposition heads may scan across both pallets. The throughput may be impacted less since the material deposition may take place on one pallet while the other pallet is being loaded or digitally printed.

Reference is now made to FIG. 11, which is a simplified diagram illustrating a view from above of a roll-to-roll printer 100 modified according to the present invention to provide both inkjet printing and an MD applicator. Printer 100 comprises a fabric roll inlet 101 in which fabric 102 from a roll moves on an adhesive blanket 103 to fabric roll outlet 104 in the direction of arrow 106. Printhead 108 scans along scan axis 110 and carries out color inkjet printing on the fabric. MD applicator 112 moves along an X axis 114 and a Y axis 116, to apply decoration etc., to the fabric. Both the MD applicator 112 and the printhead 108 may additionally move in a Z axis up and down to adjust height over the fabric.

Tests

During the development of the first prototypes the combination of raster and vector subsystem were tested. The prototypes included both a standalone XY system and an embedded system on the printhead assembly, and the results are as described above in FIGS. 3A-B, 4A-B and 5.

Table 1 refers to known technologies for MD. These technologies may be coupled in to provide different kinds of MD applicator for the present embodiments. MD applicators of different kinds may be exchanged for one another and in embodiments, two or more different kinds of applicators may be placed on separate axes to carry out decorations etc., involving more than one kind of material.

TABLE 1

Alternative MD Technologies and their Characteristics

| Deposition Technique | Viscosity Range | Particles Size | Feature Size | Operating Frequency |
|---|---|---|---|---|
| Aerosol Jet Printing | 1-1000 cPs | <500 nm | 10 um | |
| Trident PHs | 5-30 cPs | same as dimatix | 64 dpi 7, 30, 40, 50, 80 pL drop volumes | 8 kHz/20 kHz |
| ToneJet (Electrostatic PH) | | nozzle free PH | 0.2-0.4 pL, the printed layer is hundred of nm in thickness | 24 kHz |
| Alchemie - 48PL | 1-200 cPs | up to 200 um | 50 DPI/500 μm | up to 50 mL/min |
| Alchemie - 1 HV | >2500 cPs | up to 200 um | 500 μm | |
| Valve- Jet Vermes | 1-2 m cPs | up to 400 um | about 2 mm Dot gain using the 300 um nozzle | 3 kHz |
| ValveJet Gyger | 1-5000 cPs | up to 200 um | about 2 mm Dot gain using the 300 um nozzle | 3 kHz |
| Spray valve Loctite | 1-1200 | 360 um | 4.32 mm | 400 Hz |
| Spray valve (Techcon) Piezo | 1-1000 cPs | Orifice diameter 50-400 um | 0.5 nL minimum drop | 2 kHz (piezo) |
| PreeFlow dispenser | 1-millions cPs | large particle size | | up to 16 mL/min |

It is expected that during the life of a patent maturing from this application, many relevant digital printing and deposition applicators will be developed and the scope of these and other terms herein are intended to include all new technologies a priori.

As used herein the term "approximately" refers to ± one order of magnitude.

The terms "comprises", "comprising", "includes", "including", "having" and their conjugates mean "including but not limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment and the present description is to be construed as if such embodiments are explicitly set forth herein. Conversely, various features of the invention, which are, for brevity, described in the context of a single embodiment, may also be provided separately or in any suitable subcombination or may be suitable as a modification for any other described embodiment of the invention and the present description is to be construed as if such separate embodiments, subcombinations and modified embodiments are explicitly set forth herein. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A textile printer with additional deposition support comprising:

a linear track for a printing pallet extending along a first axis, the printing pallet being controllably mobile to move linearly along said track;

a rail for a digital print head, the rail extending along a second axis at right angles to said first axis;

a digital print head mounted on said rail and controllably mobile to move linearly along said second axis to scan across said printing pallet and print an image onto a garment on said printing pallet using textile printing inks;

a motion system for a material deposition head, the motion system configured to move along a third axis being parallel to said second axis and along a fourth axis being parallel or same to said first axis; and a material deposition head mounted on said motion system to move linearly on both third and fourth axes across said printing pallet to deposit material onto said garment in alignment with said image;

wherein said rail is configured to move said digital print head linearly along a single axis thereby performing raster print and said motion system is configured to move said material deposition head in more than one axis at a time therefore performing vector deposition.

2. The textile printer of claim 1, being a dual pallet printer and having two parallel tracks, one along said first axis and one along a fifth axis parallel to said first axis, said digital printing head being configured to scan across both said first axis and said fifth axis.

3. The textile printer of claim 2, wherein the digital print head and the material deposition head are controllable not to operate simultaneously on the same pallet, thereby to prevent contamination of the digital print head by material being deposited by the material deposition head.

4. The textile printer of claim 1, being a dual pallet printer and having two parallel tracks, one along said first axis and one along a fifth axis parallel to said first axis, said digital printing head being configured to scan across both said first axis and said fifth axis and said material deposition head being configured to scan along said third axis across both said first axis and said fifth axis.

5. The textile printer of claim 1, wherein the material deposition head is configured to provide layers of material for three-dimensional effects.

6. The textile printer of claim 1, wherein the material deposition head is configured to provide an undercoat for said image.

7. The textile printer of claim 1, wherein the material deposition head is configured to provide glitter.

8. The textile printer of claim 1, wherein the material deposition head is configured to provide highlight or glitter.

9. The textile printer of claim 1, wherein the material deposition head is an embroidery head for embroidering into said garment.

10. The textile printer of claim 1, wherein the material deposition head is an attachment head for attaching and sewing on buttons.

11. A roll-to-roll fabric printer with additional deposition support comprising:

a path extending along a first axis for controllably feeding a roll of fabric linearly between a first fabric roll and a second fabric roll, the fabric being unrolled from said first roll during said feeding and rolled onto said second roll to form said second roll;

a rail for a print head, the rail extending along a second axis at right angles to said first axis;

a digital print head mounted on said rail and controllably mobile along said second axis to scan across said first axis and print an image onto said fabric using fabric printing inks;

a motion system for a material deposition head, the motion system configured to move along a third axis being parallel to said second axis and along a fourth axis being parallel or same to said first axis; and a material deposition head mounted on said motion system to move linearly on both third and fourth axes to deposit material onto said fabric, between said rolling and said unrolling, in alignment with said image;

wherein said rail is configured to move said digital print head linearly along a single axis thereby performing raster print and said motion system is configured to move said material deposition head in more than one axis at a time therefore performing vector deposition.

12. A method for textile printing with additional deposition support comprising:

sending textile to be printed, the textile being fed linearly along a first, feed, axis;

controllably moving a print head along a second, print, axis at right angles to said first axis, to scan across said textile and print an image onto said textile using textile printing inks; and controllably moving a material deposition head along a third axis parallel to said second, print, axis and at right angles to said first, feed, axis to scan across said textile to deposit material onto said textile in alignment with said image;

wherein said controllably moving said print head comprises moving said print head linearly along a single axis thereby performing raster print and said controllably moving said material deposition head comprises moving said material deposition head in more than one axis at a time therefore performing vector deposition.

* * * * *